United States Patent
Mukai et al.

(10) Patent No.: US 6,816,754 B2
(45) Date of Patent: Nov. 9, 2004

(54) METHOD AND SYSTEM FOR CONTROLLING DRIVE OF A ROBOT

(75) Inventors: Kazuo Mukai, Matto (JP); Saburo Ashihara, Kanazawa (JP); Noboru Maruyama, Oshimizu-machi (JP)

(73) Assignee: Giken Co., Ltd., Nomi-gun (JP)

( * ) Notice: Subject to any disclaimer, the term of this patent is extended or adjusted under 35 U.S.C. 154(b) by 176 days.

(21) Appl. No.: 10/291,395

(22) Filed: Nov. 12, 2002

(65) Prior Publication Data

US 2003/0216833 A1 Nov. 20, 2003

(30) Foreign Application Priority Data

May 17, 2002 (JP) ........................................ 2002-143386

(51) Int. Cl.[7] ............................................. G06F 19/00
(52) U.S. Cl. ...................... 700/245; 700/246; 700/247; 700/250; 700/253; 700/257; 700/94; 318/568.12; 318/568.16; 318/577; 29/739; 29/743; 29/832; 29/834; 446/141; 446/142; 446/268; 606/1; 606/53; 606/79; 606/87; 606/88; 606/96; 701/23; 701/82; 414/416.01
(58) Field of Search ................................. 700/245–247, 700/250, 253, 257, 94; 318/568.12, 568.13, 568.16, 577; 29/739, 743, 832, 834; 414/416.01

(56) References Cited

U.S. PATENT DOCUMENTS

| 5,154,717 A | * | 10/1992 | Matsen et al. ................. 606/53 |
| 5,236,432 A | * | 8/1993 | Matsen et al. ................. 606/88 |
| 5,403,319 A | * | 4/1995 | Matsen et al. ................. 606/88 |
| 5,576,605 A | * | 11/1996 | Miyazawa .............. 318/568.12 |
| 5,690,635 A | * | 11/1997 | Matsen et al. ................. 606/88 |
| 6,718,231 B2 | * | 4/2004 | Konno et al. ................ 700/245 |
| 2002/0178578 A1 | * | 12/2002 | Okamoto et al. .............. 29/834 |

OTHER PUBLICATIONS

Wang et al., Developing khepera robot applications in a webots environment, 2000, IEEE, pp. 71–76.*

* cited by examiner

Primary Examiner—Thomas C. Black
Assistant Examiner—McDieunel Marc
(74) Attorney, Agent, or Firm—Smith Patent Office (57) ABSTRACT

A method and system for controlling drive of a robot having two or more drive axes and driven in accordance with an action program transmitted from a system controller to a robot controller by a wireless transmission way, checks whether a detected current position of the robot coincides with a predetermined start position of the robot in terms of the drive axes, and allows the robot to be driven in accordance with the designated action program when the detected current position coincides with the predetermined start position. Failure in the position control of the robot due to transmission error is prevented by the position checking.

11 Claims, 9 Drawing Sheets

FIG. 2

| ACTION | MOTION | START POSITION | | |
|---|---|---|---|---|
| 1 | 1 | $X_{11}$ | $Y_{11}$ | $Z_{11}$ |
| | 2 | $X_{12}$ | $Y_{12}$ | $Z_{12}$ |
| | ⋮ | ⋮ | ⋮ | ⋮ |
| | n | $X_{1n}$ | $Y_{1n}$ | $Z_{1n}$ |
| 2 | 1 | $X_{21}$ | $Y_{21}$ | $Z_{21}$ |
| | 2 | $X_{22}$ | $Y_{22}$ | $Z_{22}$ |
| | ⋮ | ⋮ | ⋮ | ⋮ |
| | n | $X_{2n}$ | $Y_{2n}$ | $Z_{2n}$ |
| ⋮ | ⋮ | ⋮ | ⋮ | ⋮ |
| m | 1 | $X_{m1}$ | $Y_{m1}$ | $Z_{m1}$ |
| | 2 | $X_{m2}$ | $Y_{m2}$ | $Z_{m2}$ |
| | ⋮ | ⋮ | ⋮ | ⋮ |
| | n | $X_{mn}$ | $Y_{mn}$ | $Z_{mn}$ |

METHOD AND SYSTEM FOR CONTROLLING DRIVE OF A ROBOT

BACKGROUND OF THE INVENTION

1. Field of the Invention

This invention relates to a method for controlling drive of a movable robot having two or more drive axes extending in different directions, and a system for controlling drive of such a robot.

2. Description of the Related Art

Heretofore, there have been widely used robots for handling articles in various industrial fields. Generally, such a robot has at least two drive axes extending in different directions and is constructed movable in two or three dimensions.

A conventional movable robot is connected to a transmission line for transmitting and receiving various command data and verification data as well as to a power source line for driving the robot. The power source line is adapted to supply power for driving the robot via a trolley wire. The transmission line is in the form of an expandable/contractible cable to transmit necessary data concerning driving of the robot.

In the above conventional art, it is necessary to connect a robot to a wired transmission line in addition to a power source line, which may be likely to make an installing operation of the robot cumbersome and resultantly raise the plant building costs. Particularly, when a movable robot having an exceedingly long stroke is used, a wired transmission line is required to have durability and reliable data transmission against repeated movements of the robot, not to mention increased cost for securing a long transmission line. In the case where the movable robot is controlled by a wireless transmission way, it is highly likely that the robot may run out of control due to noises coming into the wireless transmission way.

SUMMARY OF THE INVENTION

It is an object of the present invention to provide a method and system for controlling drive of a robot that are free from the problems residing in the prior art.

It is another object of the present invention to provide a method and system for controlling drive of a robot in a wireless transmission that can suppress runaway of a robot to a negligible level in even wireless transmission way.

According to an aspect of the present invention, for control of a robot having at least two drive axes, operation of an action program for the robot is initiated after a current position of the robot in terms of the drive axes is confirmed to coincide with a predetermined start position in terms of the drive axes in the action program.

These and other objects, features and advantages of the present invention will become more apparent upon a reading of the following detailed description and accompanying drawing.

DETAILED DESCRIPTION OF THE PREFERRED EMBODIMENTS OF THE INVENTION

Figure 1:
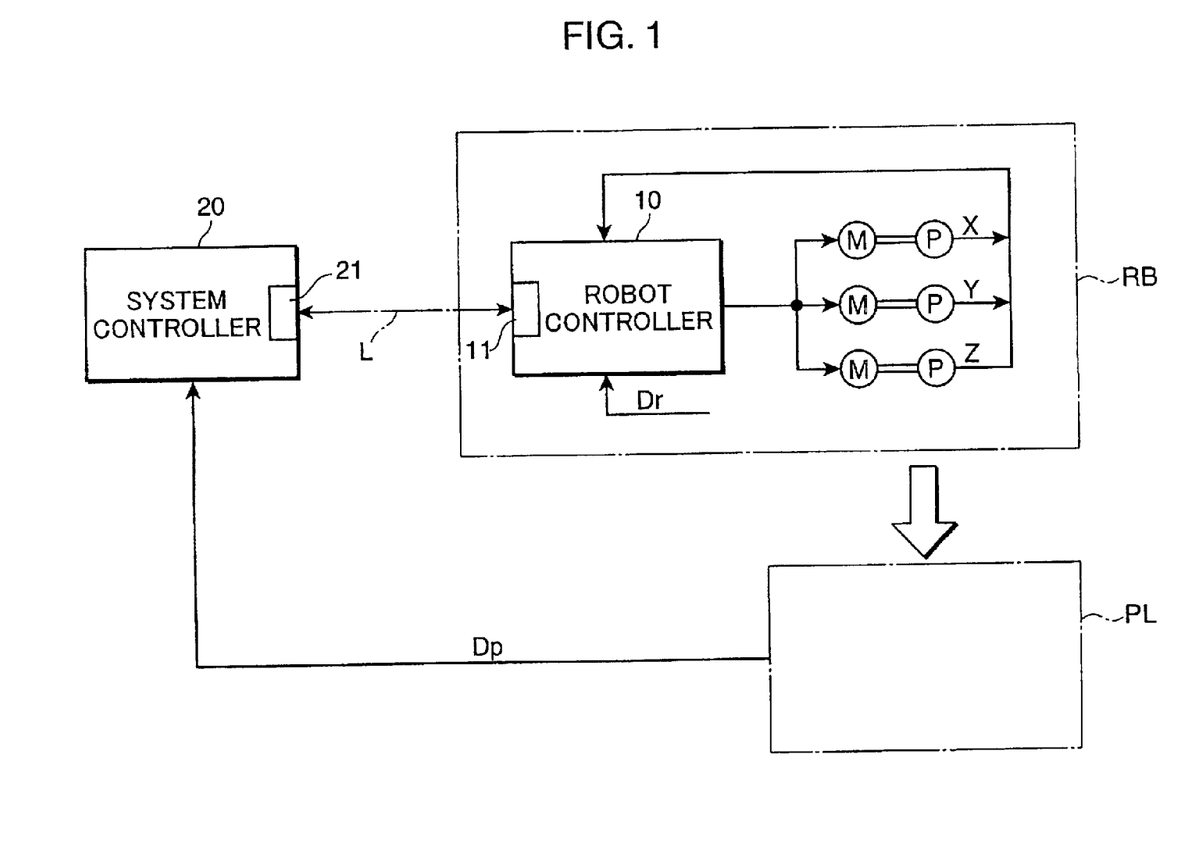
FIG. 1 is a block diagram showing an overall configuration of a robot controlling system in accordance with an embodiment of the invention.

Referring to FIG. 1, a robot controlling system in accordance with an embodiment of the invention includes a robot controller 10 mounted on a movable robot RB, a system controller 20, and a wireless transmission way L through which the robot controller 10 and the system controller 20 are connected interactively. The robot controller 10 and the system controller 20 are respectively provided with computers capable of performing programmed operations.

The robot RB has three drive axes, namely, X-axis, Y-axis, Z-axis extending perpendicular one to another. The robot RB is provided with motors M for driving the robot RB along the respective axes, and position sensors P for detecting the positions of the robot RB in respective directions along X-, Y-, Z-axes (hereinafter, simply called "X-direction, Y-direction, Z-direction").

The robot controller 10 controls the motors M individually. Detection results of the position sensors P are sent to the robot controller 10 on real-time basis as current position data of the robot RB in terms of the X-, Y-, Z-directions. Sensor information Dr sent from an unillustrated sensor provided in the robot RB is also sent to the robot controller 10.

By being moved in the X-, Y-, Z-directions, the robot RB is operable to perform a predetermined operation relative to an object PL. Let's say that the robot RB is used as a material handling robot designed to load an unfinished work onto a working machine. In this case, the working machine constitutes the object PL. In the case where the robot RB is used as a material handling robot designed to unload an article from a conveyor and transfer the article into a container at a predetermined position, the conveyor and the container constitute the object PL.

The robot controller 10 and the system controller 20 are respectively incorporated with wireless transmission units 11 and 21 to allow the robot controller 10 and the system controller 20 to perform interactive data transmission via the wireless transmission way L over the entire moving region of the robot RB. In this specification, the wireless transmission way L includes an arbitrary wireless transmission unit medium such as radio wave, light, infrared ray, and ultrasonic wave. The system controller 20 is operative to receive sensor information Dp from an unillustrated sensor provided in the object PL.

Figure 2:
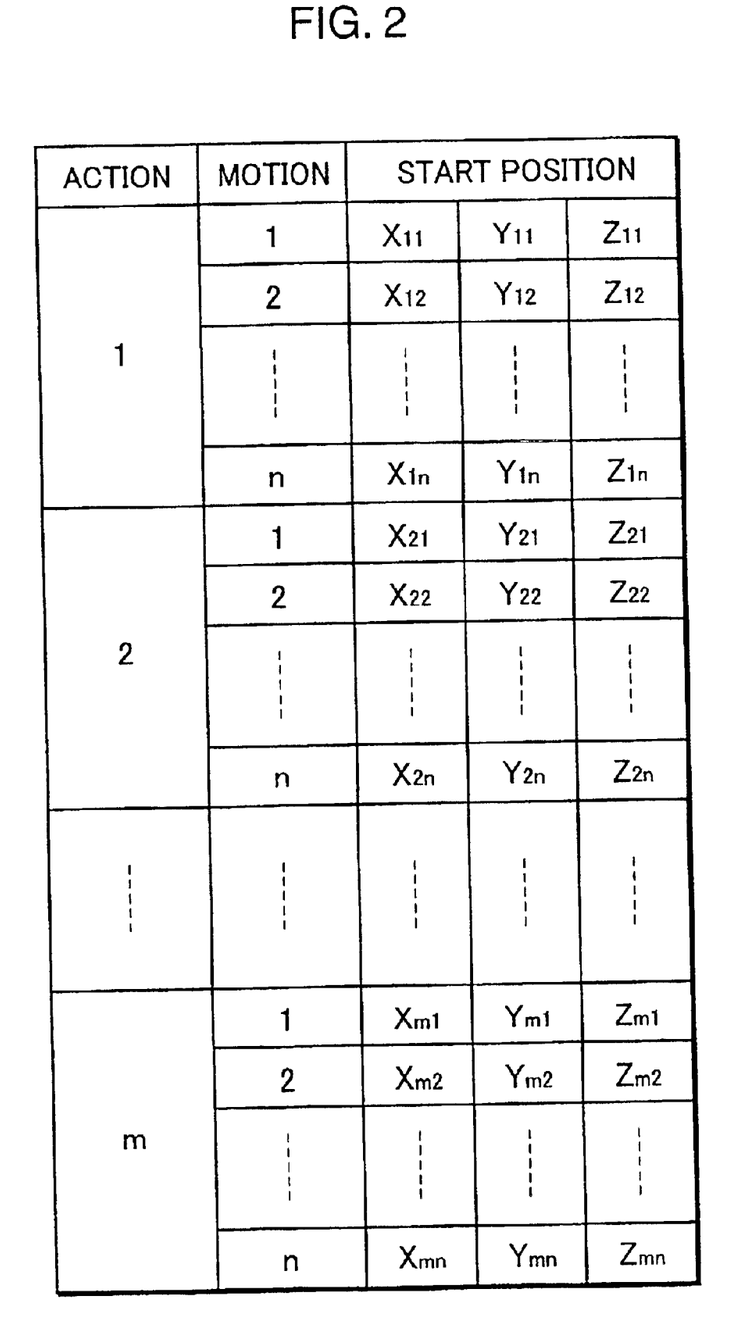
FIG. 2 is a conceptual diagram of a database in a robot controller of the robot controlling system.

Referring to FIG. 2, the robot controller 10 includes a database in which start position data ($X_{mn}$, $Y_{mn}$, $Z_{mn}$) of the robot RB is stored in association with each motion segment n (n=1, 2, . . . , n) of each action program m (m=1, 2, . . . , m). In FIG. 2, the number of motion segments n constituting each action program m may be the same or different with respect to the action programs m.

It should be noted that in the description of the embodiment, the term "action program" includes a sequence of motion segments to drive the robot in terms of drive axes. The drive axes may be so configured as to linearly or rotationally drive the robot.

Although not shown, the database shown in FIG. 2 also stores end position data ($X_m$, $Y_m$, $Z_m$) of the robot RB with respect to each action program m. In the case where there exists an action program (m+1) which is to be executed after executing the action program m in the database, the end position data ($X_m$, $Y_m$, $Z_m$) of the robot in the action program m coincides with start position data ($X_{(m+1)1}$, $Y_{(m+1)1}$, $Z_{(m+1)1}$) of the robot in motion segment 1 (n=1) of the action program (m+1). When the robot controller 10 receives a command from the system controller 20 via the wireless transmission way L to execute a certain motion segment n in a certain action program m, the robot controller 10 is operative to drive the motor(s) M of the robot RB appropriately based on data retrieved from the database shown in FIG. 2 to move the robot RB which is located at a certain position in terms of X-, Y-, Z-directions corresponding to the start position data ($X_{mn}$, $Y_{mn}$, $Z_{mn}$) in the motion segment n of the action program m, to a certain position in terms of X-, Y-, Z-directions corresponding to the start position data ($X_{m(n+1)}$, $Y_{m(n+1)}$, $Z_{m(n+1)}$) in the next motion segment (n+1) of the action program m, or to a certain position in terms of X-, Y-, Z-directions corresponding to the start position data ($X_{(m+1)1}=X_m$, $Y_{(m+1)1}=Y_m$, $Z_{(m+1)1}=Z_m$) in the motion segment 1 (n=1) of the action program (m+1) which is to be executed next.

Figure 3:
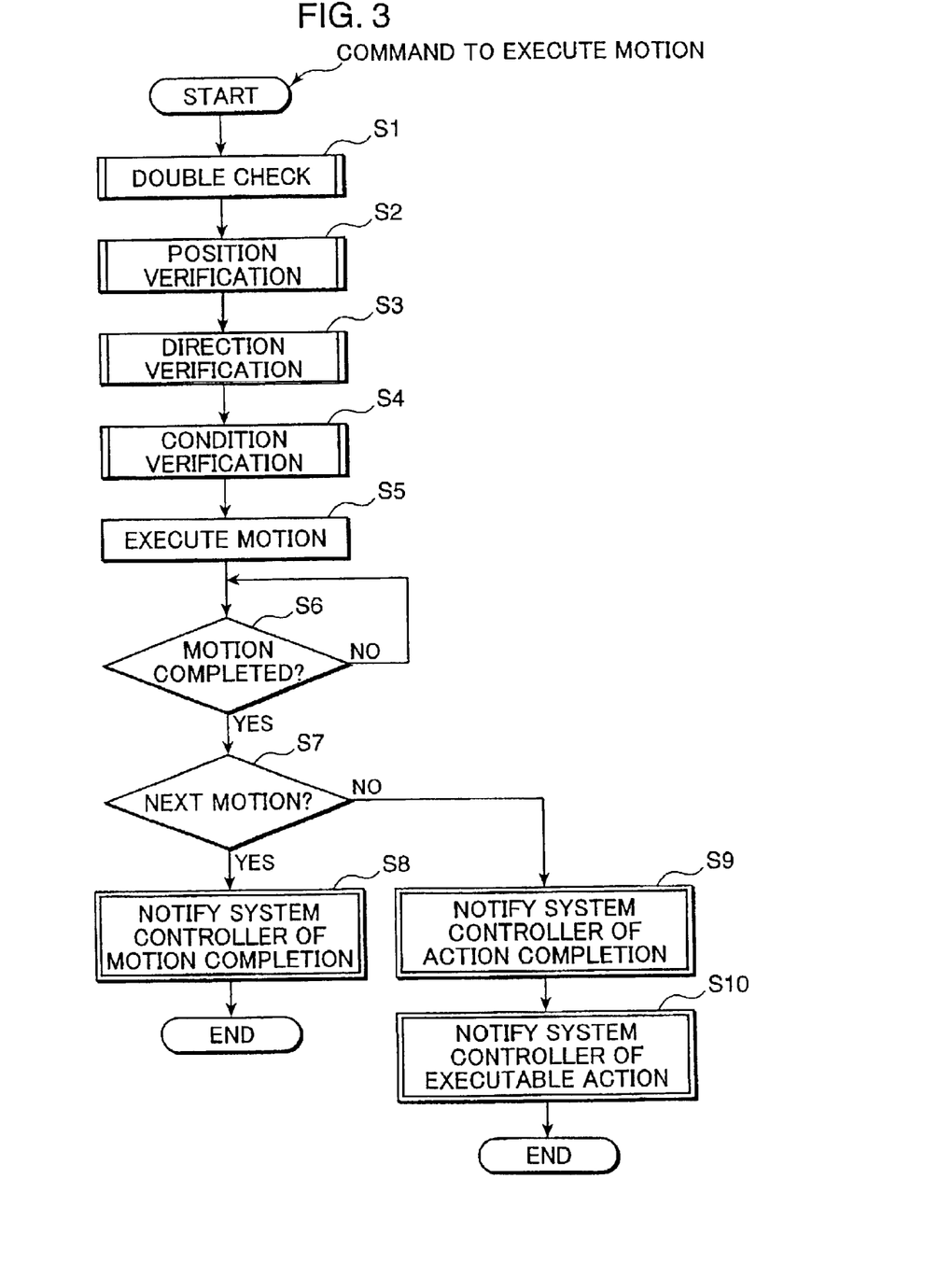
FIG. 3 is a flowchart to be implemented by the robot controller in receiving a command from a system controller to execute a certain motion segment in a certain action program.

An exemplified operation to be implemented by the robot controller 10 is shown in the flowchart of FIG. 3.

As shown in FIG. 3, when receiving a command to execute a certain motion segment n of a certain action program m from the system controller 20, the robot controller 10 executes subroutines "Double Check", "Position Verification", "Direction Verification", and "Condition Verification" which respectively correspond to Steps S1 to S4 in FIG. 3, executes the designated motion segment n of the designated action program m (Step S5), and drives the corresponding motor or motors M. Subsequently, the robot controller 10 monitors detection result of the position sensor(s) P of the robot RB corresponding to the driven motor(s) M, and waits until the motion segment n is completed (Step S6). If it is judged that there is a next motion segment (n+1) in the designated action program m (YES in Step S7), the robot controller 10 notifies the system controller 20 of completion of the motion segment n through the wireless transmission way L (Step S8), and the flow is ended. On the other hand, if it is judged that there is no next motion segment (n+1) in the designated action program m (NO in Step S7), the robot controller 10 notifies the system controller 20 of completion of the operation of the designated action program m (Step S9), also notifies the system controller 20 of an action program m' which is executable next (m'≠m) (Step S10), and the flow is ended.

Judgment as to whether there is a next motion segment (n+1) in Step S7 in FIG. 3 may be made by judging whether the motion segment n executed in Steps S5 and S6 is a final motion segment of the action program m based on data retrieved from the database shown in FIG. 2. Further, in Step S10, an action program m' which is executable next may be found by extracting the action program m', from the database shown in FIG. 2, satisfying the requirement: $X=X_m$, $Y=Y_m$, $Z=Z_m$ which represents that a detected current position of the robot in terms of X-, Y-, Z-directions after completing Steps S5 and S6 coincides with the start position data ($X_{m'1}$, $Y_{m'1}$, $Z_{m'1}$). In this case, the number of action program m' may be one or more than one.

Figure 4:
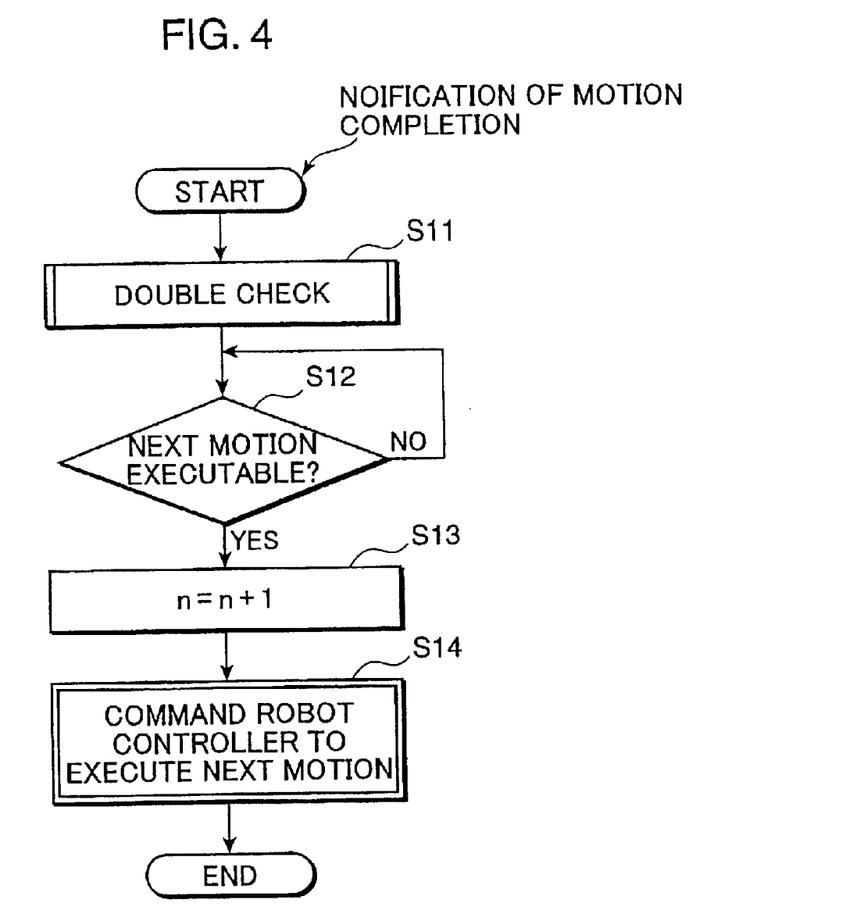
FIG. 4 is a flowchart to be implemented by the system controller in receiving data from the robot controller of completion of a motion segment.

When the robot controller 10 notifies the system controller 20 of completion of the motion segment n in the action program m (Step S8), the system controller 20 is activated to implement predetermined operations in accordance with the flowchart shown in FIG. 4. Specifically, the system controller 20 executes the subroutine "Double Check" (Step S11 in FIG. 4), judges whether a next motion segment (n+1) is executable (Step S12), sets n=n+1 (Step S13), and transmits a command to the robot controller 10 to perform the motion segment n=n+1 in the action program m (Step S14). Upon receiving the command, the robot controller 10 is operative to execute the next motion segment (n+1) in the action program m in accordance with the flowchart of FIG. 3.

In this way, the robot controller 10 transmits report data concerning completion of a motion segment of an action program m to the system controller 20 each time the motion segment is completed, and the system controller 20 in turn transmits command data to the robot controller 10 to execute a next motion segment of the action program m each time receiving the report data. Namely, the robot controller 10 and the system controller 20 interactively transmit with each other while exchanging the command data and the report data, thus executing the motion segment n=1, 2, . . . , n in the action program m one by one. Alternatively, in Step S12 in FIG. 4, the system controller 20 may make judgment as to whether the motion segment (n+1) is executable by referring to a control logic including the sensor information Dp sent from the object PL. In this instant, the system controller 20 preferably stores a control logic in advance for allowing the robot controller 10 to execute the next motion segment (n+1) in the action program m each time the motion segment n in the action program m is completed.

Upon receiving notification from the robot controller 10 of completion of the designated action program m along with a next executable action program m' (Steps S9 and S10 in FIG. 3), the system controller 20 executes the subroutine "Double Check" (Step S21 in FIG. 5), and designates an action program m=m' to be executed next among the action programs m' which the robot controller 10 notifies to be executable next (Step S5 in FIG. 1). At this time, the system controller 20 designates a specified single action program m=m' so that a control operation of the system controller 20 may comply with a predetermined control logic including the sensor information Dp and the order of controlling the robot RB. The system controller 20 may automatically select the action program m satisfying the requirement that the detected current position data of the robot RB in terms of the X-, Y-, Z-directions coincides with the start position data ($X_{m1}$, $Y_{m1}$, $Z_{m1}$). This is because the executable action program m' transmitted from the robot controller 10 includes the start position data satisfying the requirement: $X_{m'1}=X$, $Y_{m'1}=Y$, $Z_{m'1}=Z$.

Subsequently, the system controller 20 transmits a command to the robot controller 10 to execute the motion segment 1 (n=1) of the designated action program m, namely, to initiate operations of the designated action program m (Step S26 in FIG. 5), and the flow is ended. At this time, the control program 10 and the system controller 20 are operative to execute the motion segment n (=1, 2, . . . , n) of the designated action program m one by one in accordance with the flowcharts in FIGS. 3 and 4, respectively.

Figure 5:
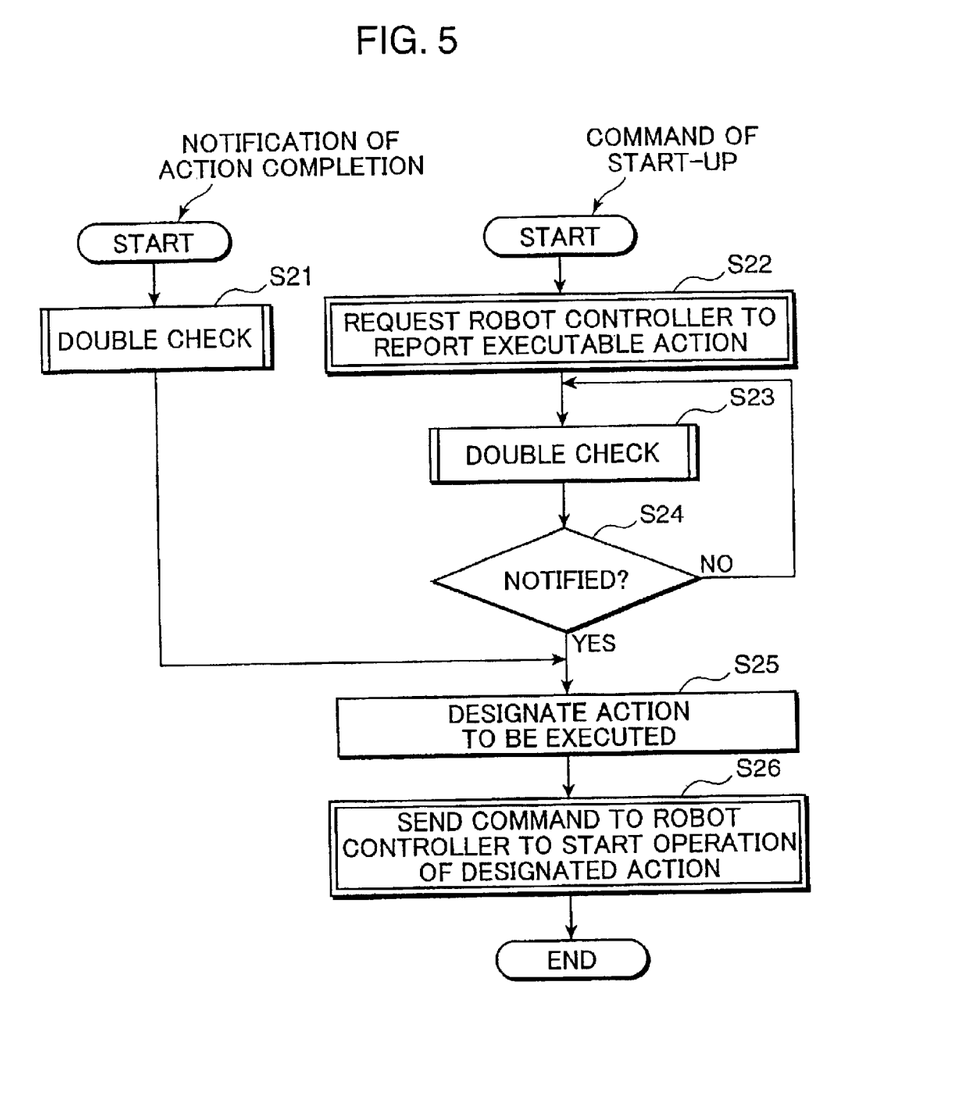
FIG. 5 is a flowchart to be implemented by the system controller in receiving data from the robot controller of completion of a designated action program or in receiving a command from an external apparatus to start-up the system controller.

Upon receiving a start-up command from an external apparatus, the system controller 20 requests the robot controller 10 to report the system controller 20 of an executable action program m (Step S22 in FIG. 5). Upon receiving the request, the robot controller 10 retrieves one or more than one action program m from the database of FIG. 2 which satisfies the requirement: $X_{m1}=X$, $Y_{m1}=Y$, $Z_{m1}=Z$ representing that the detected current position data of the robot RB in terms of the X-, Y-, Z-directions coincides with the start position data, and notifies the system controller 20 of the retrieved action program m satisfying the requirement. Meanwhile, the system controller 20 waits for the report of the retrieval result from the robot controller 10 while executing the subroutine "Double Check" (Step S23, S24), designates a certain action program m which is to be executed next among the action programs m which the robot controller 10 has reported executable (Step S25), transmits a command to the robot controller 10 to start operation of the designated action program m (Step S26), and the flow is ended.

In this way, the system controller 20 transmits a command to the robot controller 10 to start operation of the action program m in Step S26. The action program m designated in Step S26 is the one which satisfies the requirement: $X_{m1}=X$, $Y_{m1}=Y$, $Z_{m1}=Z$ representing that the detected current position of the robot RB in terms of the X-, Y-, Z-directions coincides with the start position data. This is because the action program m is designated from the action programs m' and m which have been extracted from the robot controller 10 based on a judgment whether the requirement: $X_{m1}=X$, $Y_{m1}=Y$, $Z_{m1}=Z$ is satisfied in Step S10 in FIG. 3 or in response to the request in Step S22 in FIG. 5.

Referring to FIGS. 3 through 5, the steps indicated by the double frame, namely, Steps S8 to S10 in FIG. 3, Step S14 in FIG. 4, and Steps S22 and S26 in FIG. 5 represent data transmission between the robot controller 10 and the system controller 20 via the wireless transmission way L. The respective operations in these steps are implemented with use of the subroutine "Data Re-transmission" in FIG. 6.

Figure 6:
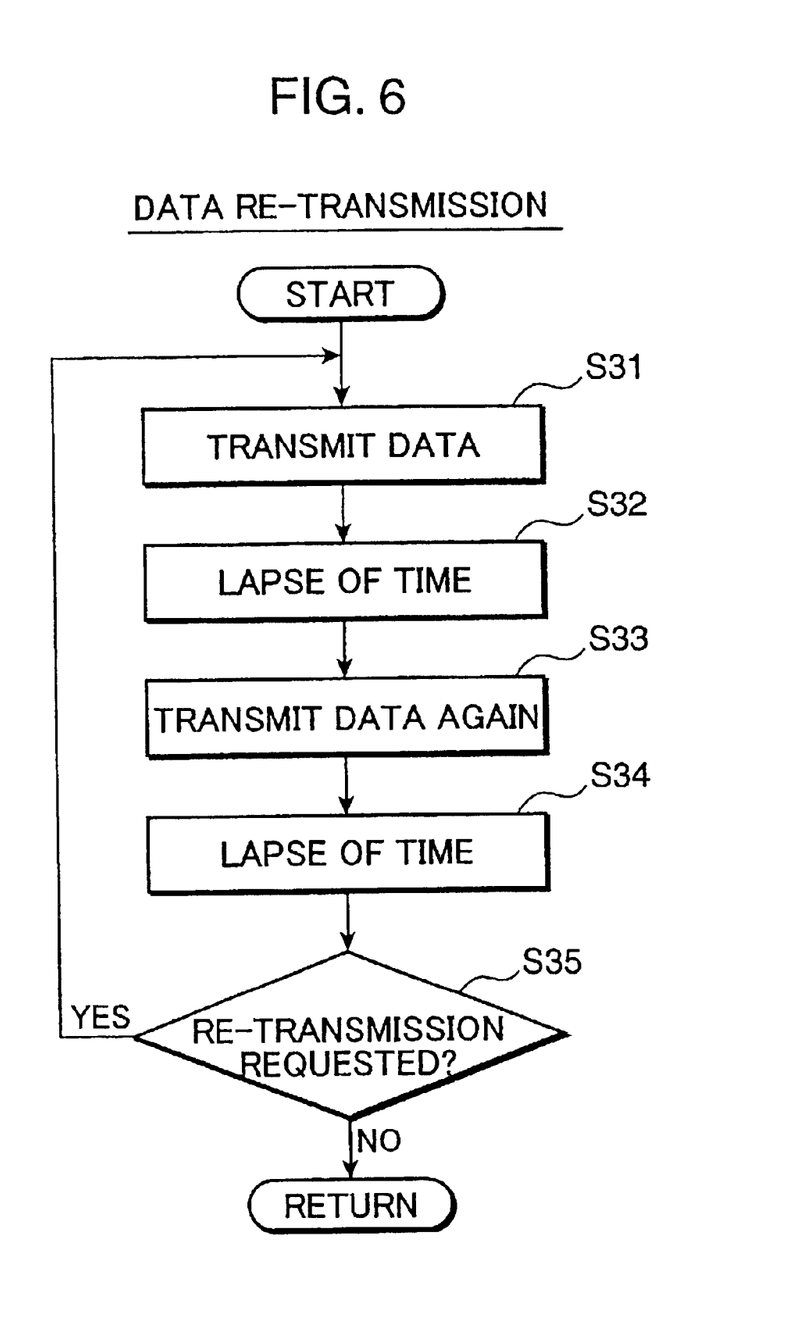
FIG. 6 is a flowchart of a subroutine "Data Retransmission" to be implemented by the robot controlling system.

Referring to FIG. 6, when data is transmitted, for example, from the system controller 20 to the robot controller 10 (Step S31 in FIG. 6), upon lapse of a certain time (Step S32), the same data is transmitted from the system controller 20 to the robot controller 10 again (Step S33). Thereafter, upon lapse of a certain time (Step S34), if the data transmitter (in this case, the system controller 20) verifies that there is no more request of data retransmission from the counterpart controller or data recipient (in this case, the robot controller 10) (NO in Step S35), the flow returns to the main routine. However, if the data transmitter verifies that there is a request of data retransmission from the data recipient (YES in Step S35), the whole operations in the steps (Steps S31 to S35) of FIG. 6 are cyclically repeated. Namely, either one of the robot controller 10 and the system controller 20 (data transmitter) is operative to transmit the same data twice to the counterpart controller (data recipient) via the wireless transmission way L.

Figure 7:
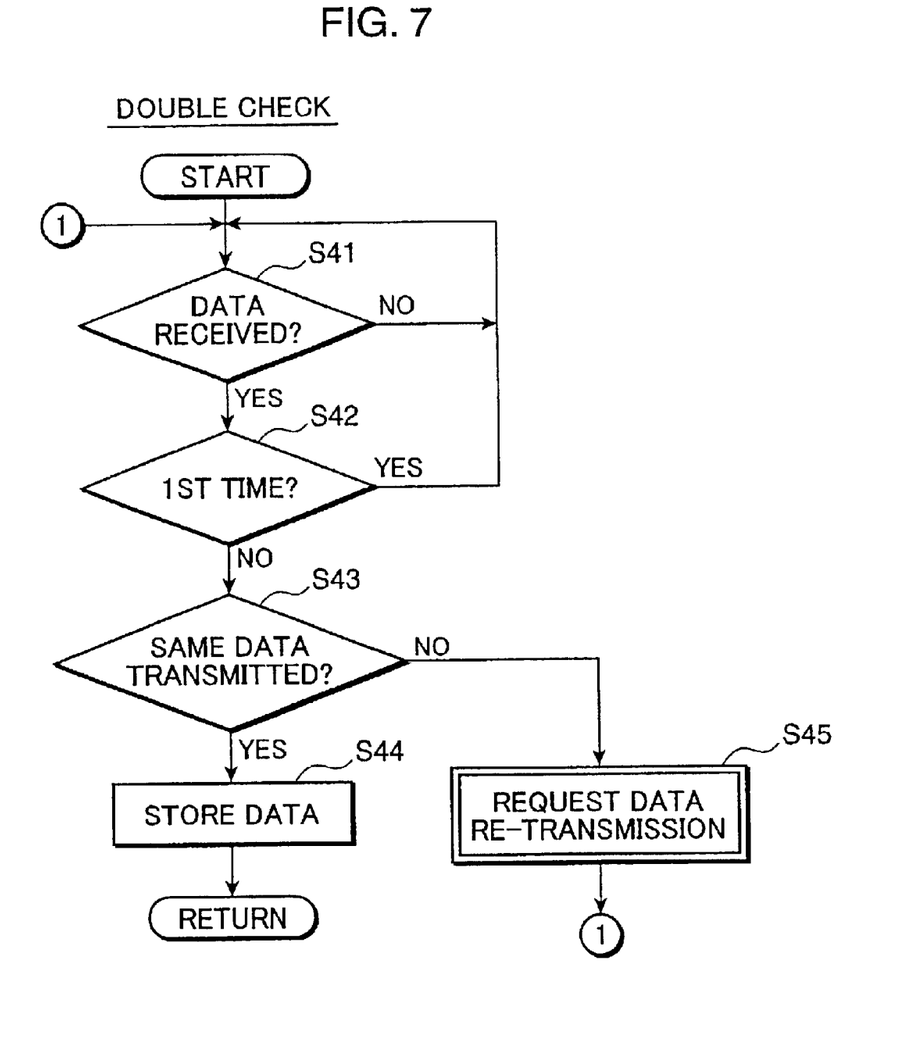
FIG. 7 is a flowchart of a subroutine "Double Check" to be implemented by the robot controlling system.

In receiving the data from the data transmitter, the counterpart controller or the data recipient executes the subroutine "Double Check" (see Step S1 in FIG. 3, Step S11 in FIG. 4, Steps S21, S23 in FIG. 5, and FIG. 7).

Referring to FIG. 7, when one of the robot controller 10 and the system controller 20 (data recipient) receives a certain data from the counterpart controller (data transmitter) (YES in Step S41 in FIG. 7), the data recipient judges whether the data has been sent twice (Step S42). If it is judged that the data has been sent twice (NO in Step S42), then, it is judged whether the data in the first transmission is the same as the data in the second transmission (Step S43). If it is judged that the same data has been transmitted in the first and second transmissions (YES in Step S43), the received data is stored as valid data (Step S44). If it is judged that the data in the first transmission is not the same as the data in the second transmission (NO in Step S43), the data recipient requests the counterpart controller (data transmitter) to transmit the data again (Step S45). Thus, the operations in the steps of FIG. 7 (Steps S41 to S43, and Step S45) are cyclically repeated. With this function, the robot controlling system can judge the received data valid when satisfied is the requirement that the data in the successive two transmissions are the same as each other. In particular, the robot controller 10 can judge the action program m designated by the system controller 20 valid by implementing the subroutine "Double Check" in Step S1 of FIG. 1 regarding judgment as to whether data in successive two transmissions are the same as each other.

Figure 8:
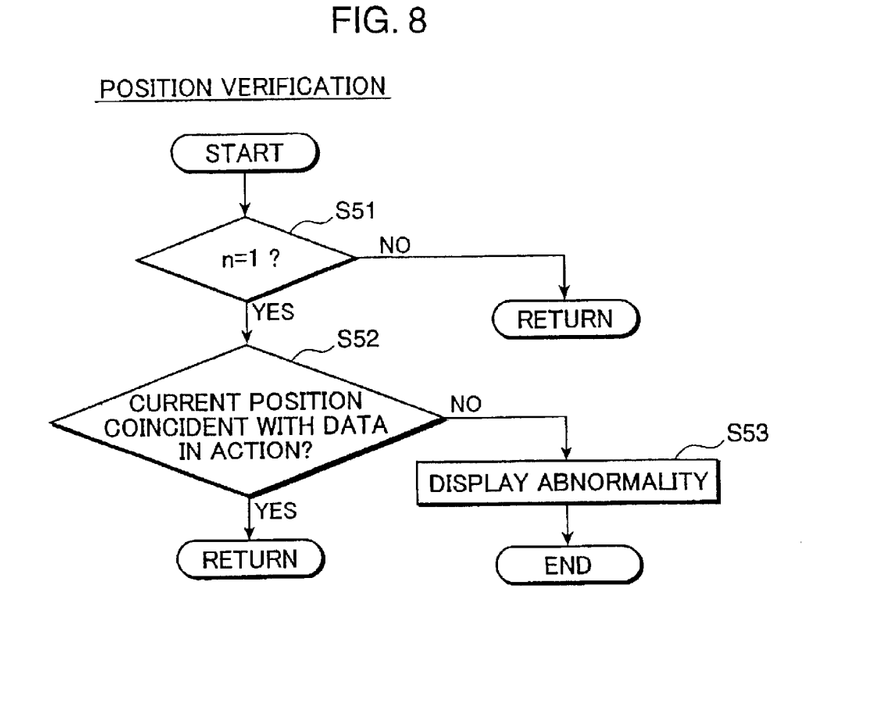
FIG. 8 is a flowchart of a subroutine "Position Verification" to be implemented by the robot controlling system.

Now, the subroutine "Position Verification" of Step S2 in FIG. 3 is described with reference to the flowchart shown in FIG. 8. Referring to FIG. 8, if the motion segment to be executed is not the motion segment n=1 of the action program m designated by the system controller 20 (NO in Step S51), the flow returns to the main routine. If the motion segment to be executed is n=1 (YES in Step S51), then, it is judged whether $X_{m1}=X$, $Y_{m1}=Y$, $Z_{m1}=Z$ where X, Y, Z represent detected current position data of the robot RB in terms of the X-, Y-, Z-directions, and $X_{m1}$, $Y_{m1}$, $Z_{m1}$ represent start position data of the robot RB in the designated action program m in terms of the X-, Y-, Z-directions (Step S52). If the position of the robot RB satisfies the above requirements in all the X-, Y-, Z-directions, the flow returns to the main routine. If at least one of the requirements with respect to the X-, Y-, Z-directions is not satisfied (NO in Step S52), the robot controller 10 causes a display section to display abnormality of control operation of the robot RB (Step S53), and forcibly terminates the control operation of the robot RB. In view of the above, the robot controller 10 is allowed to start the operation of the action program m when satisfied is a requirement that the detected current position data of the robot RB in terms of the X-, Y-, Z-directions coincides with the start position data ($X_{m1}$, $Y_{m1}$, $Z_{m1}$) of the robot RB in the action program m designated by the system controller 20 (Steps S2 and S5 in FIG. 3).

Figure 9:
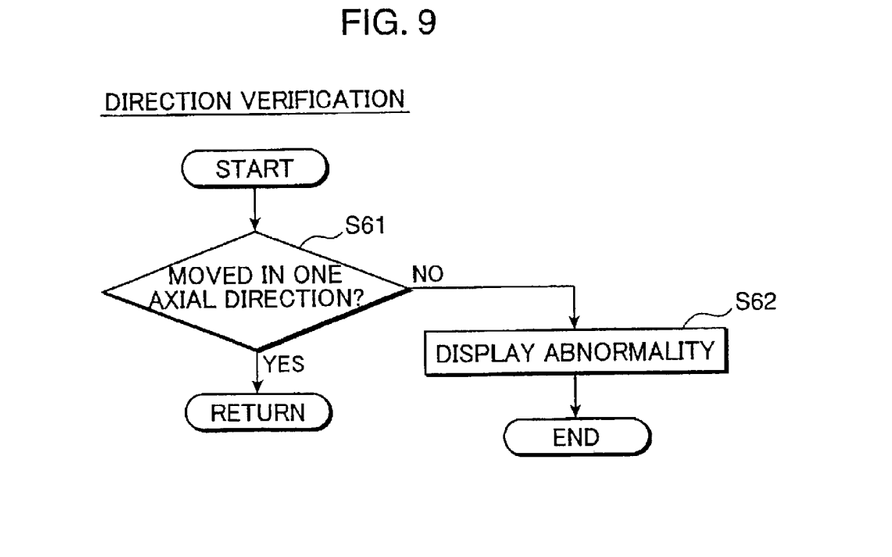
FIG. 9 is a flowchart of a subroutine "Direction Verification" to be implemented by the robot controlling system.

FIG. 9 shows an exemplified content of the subroutine "Direction Verification" to be implemented by the robot controller 10 in Step S3 of FIG. 3. Specifically, in FIG. 9, if it is judged that the robot RB is moved in one of the X-, Y-, Z-directions in the motion segment n of the designated action program m (YES in Step S51 in FIG. 9), the flow returns to the main routine. If it is judged that the robot RB is moved in at least two directions of the X-, Y-, Z-directions (NO in Step S51) at the same time, the robot controller 10 causes the display section to display abnormality of control operation of the robot RB (Step S62), and forcibly terminates the control operation of the robot RB.

It should be appreciated that the judgment in Step S61 in FIG. 9 is executable in the case where one of moved amounts Δx, Δy, Δz of the robot RB in the respective X-, Y-, Z-directions is not zero with the rest being zero under the requirement: $\Delta x = X_{m(n+1)} - X_{mn}$, $\Delta y = Y_{m(n+1)} - Y_{mn}$, $\Delta z = Z_{m(n+1)} - Z_{mn}$ where the start position data of the robot RB in terms of the X-, Y-, Z-directions in the motion segment n and the subsequent motion segment (n+1) of the action program m are respectively represented as $(X_{mn}, Y_{mn}, Z_{mn})$ and $(X_{m(n+1)}, Y_{m(n+1)}, Z_{m(n+1)})$, On the other hand, the judgment in Step S61 is not executable in the case where all the moved amounts $\Delta x$, $\Delta y$, $\Delta z$ of the robot RB are zero (namely, $\Delta x = \Delta y = \Delta z = 0$), or at least two of the moved amounts $\Delta x$, $\Delta y$, $\Delta z$ of the robot RB are not zero. In the case where there does not exist a next motion segment (n+1) in the action program m, the end position data $(X_m, Y_m, Z_m)$ may be used in place of the start position data $(X_{m(n+1)}, Y_{m(n+1)}, Z_{m(n+1)})$ By implementing the subroutine "Direction Verification", the robot controller 10 can start the operation of the motion segment n only after confirming that the motion segment n of the designated action program m designates driving the robot RB in one of the X-, Y-, Z-directions (in Steps S3 and S5 in FIG. 3).

The robot controller 10 executes the subroutine "Condition Verification" (Step S4 in FIG. 3), which is a check routine (not shown) for checking whether executable is the motion segment n in the designated action program m including the sensor information Dr output from the sensor in the robot RB.

Figure 10:
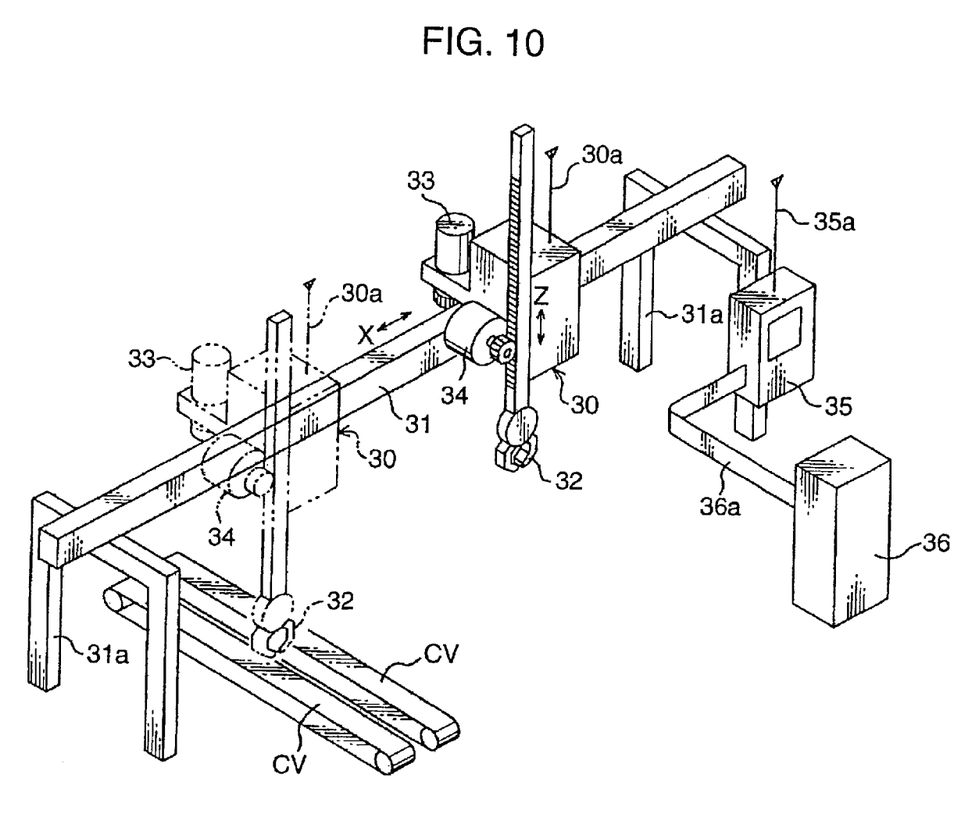
FIG. 10 is a perspective view exemplarily showing an arrangement as to how the inventive robot controlling system is applied to driving of a robot.

The robot controlling system having the above arrangement is applicable to a robot 30 adapted to unload an article conveyed by a pair of conveyors CV, CV to transfer the article to a predetermined position (see FIG. 10).

Referring to FIG. 10, the robot 30 is movably supported on a beam 31 by way of support frames 31a, 31a. The robot 30 is equipped with a gripping hand 32 for holding and moving an article up and down. The robot 30 is further provided with a robot driving motor 33 for driving the robot 30, and a hand driving motor 34 for driving the gripping hand 32. Specifically, the motor 33 can drivingly move the robot 30 along the longitudinal direction of the beam 31 (X-directions shown by the arrows in FIG. 10), and the motor 34 can drivingly move the gripping hand 32 up and down (Z-directions shown by the arrows in FIG. 10). Thus, the robot 30 has two drive axes extending in X-directions, and Z-directions.

The robot 30 is loaded with an unillustrated robot controller. The robot controller is interactively connected to an external system controller 35 by way of a wireless transmission way between an antenna 30a on the top of the robot 30 and an antenna 35a on the top of the system controller 35. The system controller 35 is electrically connected to another robot controller 36 via a cable 36a. The robot controller 36 is adapted to control an overall operation of a pair of conveyors CV, CV, the gripping hand 32, etc.

The robot RB, the robot controller 10, and the system controller 20 in FIG. 1 respectively correspond to the robot 30, the robot controller in the robot 30, and the system controller 35 in FIG. 10. The object PL in FIG. 1 corresponds to the conveyor pair CV, CV in FIG. 10. The motors M, M for driving the robot RB in X-, Z-directions in FIG. 1 respectively correspond to the motors 33, 34 in FIG. 10.

Loading a database corresponding to the database in FIG. 2 in the robot controller of the robot 30 and activating the robot controller and the system controller 35 in FIG. 10 in accordance with the flowcharts in FIGS. 3 through 9 enables to controllably drive the robot 30 according to a predetermined order of movements of the robot to unload articles that have been carried along the conveyor pair CV, CV one after another to a predetermined position with use of the gripping hand 32 of the robot. The database to be loaded in the robot controller of the robot 30 may preferably have such a storage capacity as to store data corresponding to start position data $(X_{mn}, Z_{mn})$ and end position data $(X_m, Z_m)$ of a robot in terms of X-, and Z-directions. Further, allowing the system controller 35 or the controller 36 to store control timings regarding drive/suspend operations of the conveyor pair CV, CV and open/close operations of the gripping hand 32, for example, in association with a specified motion segment n of an action program m which defines drive control contents of the robot 30 enables the system controller 35 to transmit a command regarding these operations to the robot controller in the robot 30 according to needs.

Referring to FIG. 1, the sensor information Dr in the robot RB is also transmittable to the system controller 20 by the wireless transmission way L. In this way, the system controller 20 can streamline a control logic for judgment as to whether a next motion segment (n+1) is executable and designation of an action program m to be executed next based on the sensor information Dp transmitted from the object PL and the sensor information Dr transmitted from the robot RB.

It should be appreciated that the subroutines "Data Retransmission" and "Double Check" in the flowcharts of FIGS. 3 through 9 are not necessarily applied to all the data transmission via the wireless transmission way L. Alternatively, these subroutines may be applied merely to Step S14 in FIG. 4, Step S26 in FIG. 5, and Step S1 in FIG. 3. This altered arrangement minimizes burden on data transmission. Applying the subroutines "Data re-transmission" and "Double Check" in a needless situation undesirably extends time required for data transmission, which may hinder quick response of the robot control.

It may be possible to incorporate the check operation of Step S43 in FIG. 7 as to whether the contents of data in successive two transmissions are the same as each other in the subroutine "Data Re-transmission" in FIG. 6. In such a case, it is required for a data recipient to transmit the received data back to a data transmitter each time receiving the data. In the case where the data recipient does not respond properly in both of the data transmissions, namely, fails to transmit back the data to the data transmitter in both of the data transmissions, then, the Steps S31 to S34 in FIG. 6 are cyclically repeated. In the case where the data received in the first transmission is the same as the data received in the second transmission, the data recipient cancels the received data and enters stand-by mode. The data recipient is not required to request data re-transmission to the data transmitter.

Further, Step S51 in FIG. 8 may be omitted. In such an altered arrangement, judgment regarding the current position of the robot as to whether the requirement: $X_{mn}=X$, $Y_{mn}=Y$, $Z_{mn}=Z$ is satisfied can be made before initiating operation of each motion segment n of each action program m in addition to the time of initiating operation of each action program m.

Furthermore, in Step S61 in FIG. 9, judgment may be made as to the motion segment n of the action program m is in a predetermined drive axis direction a (a=1, 2. . . ). The drive axis direction a is stored in the robot controller 10 with use of the database of FIG. 2 for each motion segment n of the action program m. Alternatively, the drive axis direction a may be stored in the system controller 20. In either way, each time the system controller 20 transmits a command to the robot controller 10 of executing the motion segment n in the action program m, the drive axis direction a is properly updated by the robot controller 10 itself or in response to the command from the system controller 20.

It should be appreciated that a cylindrical coordinate system and a polar coordinate system in addition to an orthogonal coordinate system may be applied to the drive axes of the robot RB to rotationally drive the robot RB. Alternatively, a multiarticular system for driving the robot RB in directions of three or more axes may be incorporated.

As descried above, in driving a robot having at least two drive axes via a wireless transmission way, an operation of an action program is initiated when satisfied is a requirement that a detected current position of the robot in terms of the drive axes coincides with start position data in the action program.

Preferably, an operation of a motion segment in the designated action program may be initiated when the motion segment of the designated action program requires driving the robot in only one of the drive axes. Preferably, the designated action program may be judged to be valid when satisfied is a requirement that subsequently transmitted data are the same as each other.

In the inventive method, the operation of the action program is initiated only after confirming that the detected current position of the robot in terms of the drive axes coincides with the start position data of the robot in the designated action program. In other words, even if the robot erroneously receives a command of executing a certain action program, the operation of the action program is prohibited if the detected current position of the robot in terms of the drive axes does not coincide with the start position data in the designated action program. Thereby, the inventive method can realize robot control with a high reliability. It should be noted that the start position data in each action program is stored in advance in a database provided in the robot controller of the robot. Such a database can be automatically and easily created by defining the movements of the robot in teaching because, in carrying out teaching, it is generally indispensable to enter start position data and end position data of the robot in order to define predetermined movements of the robot and the order of movements thereof.

In the inventive method, setting the requirement that the robot drive control is initiated only after confirming that the motion segment of the designated action program designates driving the robot in one of the directions along the drive axes enables to easily detect error of the database created with aid of teaching without a likelihood that the robot may be driven in two or more directions of the drive axes at the same time. If a robot having three drive axes extending perpendicular one to another is permitted to move in two drive-axis directions simultaneously, the robot resultantly moves in an oblique direction over a single plane bearing the two drive axes, which may cause unexpected interference with other parts. Setting the requirement that the control operation of the robot is initiated only after confirming that the robot is allowed to move only in one direction of the drive axes in each motion segment effectively enables to eliminate such a drawback.

Furthermore, in the inventive method, the designated action program is judged valid when satisfied is the requirement that subsequently transmitted data are the same as each other. Thereby, an adverse effect due to noises coming into the wireless transmission way can be effectively eliminated. This is because it less likely that the same type or manner of erroneous data transmission occurs two times in a row due to such noise. In view of this, it is sufficient to set the number of times of receiving data in succession at least at two.

The inventive method is advantageous in eliminating a possibility that the robot is displaced away from the start position where the robot is supposed to stay before initiation of the operation of each action program and in minimizing a possibility of runaway of the robot substantially to a negligible level in use of a wireless transmission way. The inventive method is advantageous in securing sufficiently high level of controllability without using a wired transmission line.

Also, an inventive system for controllably driving a robot comprises: a robot having at least two drive axes; a robot controller provided on the robot for controlling a drive source of driving the robot along each drive axis; and a system controller connected to the robot controller via a wireless transmission way for allowing the robot controller to controllably drive the robot according to an action program. An operation of the action program is initiated when satisfied is a requirement that a current position of the robot in terms of the drive axes coincides with the start position data of the robot in terms of the drive axes in the action program transmitted from the system controller.

Preferably, the robot controller may be allowed to initiate the operation of the motion segment when satisfied is a requirement that the motion segment of the designated action program designates driving the robot in only one of the drive axes. Preferably, the designated action program may be judged valid when satisfied is a requirement that the data subsequently transmitted from the system controller are the same as each other.

Preferably, the robot controller may notify the system controller of completion of the designated action program. Preferably, the robot controller may notify the system controller of completion of each motion segment of the designated action program.

Specifically, the robot controller is interactively connected to the system controller via the wireless transmission way, and initiates the operation of the designated action program when satisfied is the requirement that the detected current position of the robot in terms of the drive axes coincides with the start position data in the designated action program sent from the system controller. Furthermore, the operation of the motion segment in the designated action program is initiated when satisfied is the requirement that the motion segment of the designated action program designates driving the robot in only one of the drive axes. The designated action program is judged valid when satisfied is the requirement that the data subsequently transmitted from the system controller are the same as each other.

In the inventive system, upon receiving the notification from the robot controller of completion of the designated action program, the system controller is operative to designate an action program to be executed next by referring to a predetermined control logic and transmit a command to the robot controller to implement the designated action program. Further, upon receiving the notification from the robot controller of completion of each motion segment of the designated action program, the system controller transmits a command to the robot controller to implement the next motion segment in the designated action program by referring to a predetermined control logic.

The inventive system is advantageous in remarkably reducing the cost required for installing and arranging a wired transmission line as well as the cost required for normal maintenance of the wired transmission line because the above arrangement does not need a wired transmission line, in addition to the advantage that the inventive robot controlling method can be carried out with use of the inventive system.

This application is based on patent application No. 2002-143386 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A method for controlling drive of a robot which has two or more drive axes and is driven in accordance with an action program, comprising the steps of:

receiving command data via a wireless transmission way;

detecting a current position of the robot in terms of the drive axes;

checking whether a detected current position coincides with a predetermined start position of the robot in terms of the drive axes, the predetermined start position being set in an action program designated by the command data; and allowing the robot to be driven in accordance with the designated action program when the detected current position coincides with the predetermined start position.

2. The method according to claim 1, wherein the action program includes a plurality of motion segments, and the command data designates one of the plurality of motion segments of the action program, and the designated motion segment is initiated when the motion segment requires driving the robot in only one of the drive axes.

3. The method according to claim 2, wherein transmission of the same command data is subsequently performed at least two times, and the received command data is judged to be valid when the subsequently received command data are the same as each other.

4. The method according to claim 1, wherein transmission of the same command data is subsequently performed at least two times, and the received command data is judged to be valid when the subsequently received command data are the same as each other.

5. A system for controlling drive of a robot which has two or more drive axes and is driven in accordance with an action program, comprising:

a system controller for centrally controlling operations in connection with the system;

a robot controller which is carried by the robot, and is connected with the system controller by a wireless transmission way to receive command data from the system controller, the command data designating an action program for the robot; and a detector which detects a current position of the robot in terms of the drive axes;

wherein the robot controller checks whether a detected current position coincides with a predetermined start position of the robot in terms of the drive axes, the predetermined start position being set in an action program designated by the command data; and allows the robot to be driven in accordance with the designated action program when the detected current position coincides with the predetermined start position.

6. The system according to claim 5, wherein the action program includes a plurality of motion segments, and the command data designates one of the plurality of motion segments of the action program, and the robot controller allows the robot to be driven in accordance with the designated motion segment when the motion segment requires driving the robot in only one of the drive axes.

7. The system according to claim 6, wherein the robot controller notifies the system controller of completion of each motion segment of the designated action program.

8. The system according to claim 6, wherein the system controller performs transmission of the same command data to the robot controller subsequently at least two times, and the robot controller judges the received command data valid when the subsequently received command data are the same as each other.

9. The system according to claim 8, wherein the robot controller notifies the system controller of completion of each motion segment of the designated action program.

10. The system according to claim 5, wherein the system controller performs transmission of the same command data to the robot controller subsequently at least two times, and the robot controller judges the received command data valid when the subsequently received command data are the same as each other.

11. The system according to claim 5, wherein the robot controller notifies the system controller of completion of the designated action program.

* * * * *